Figure 1:
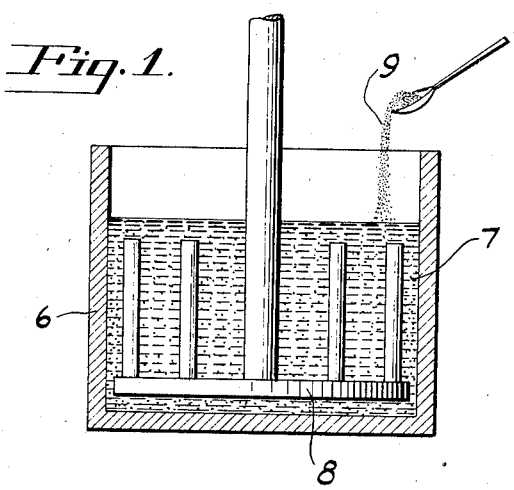

Dec. 5, 1944.  R. A. SCHAEFER  2,364,317

METHOD OF MAKING SELF-INSULATED REFRACTORIES

Filed Sept. 16, 1941

Inventor
Reinhold A. Schaefer
by Brown + Parham
Attorneys

Patented Dec. 5, 1944

2,364,317

UNITED STATES PATENT OFFICE 2,364,317

METHOD OF MAKING SELF-INSULATED REFRACTORIES

Reinhold A. Schaefer, Rocky Hill, Conn., assignor to Hartford-Empire Company, Hartford, Conn., a corporation of Delaware Application September 16, 1941, Serial No. 411,030

2 Claims. (Cl. 25—156)

This invention relates to refractories and has particular relation to refractories of insulating character, that is, refractories having a high fusion point which have been rendered porous to impart heat insulating properties thereto. Such refractories are distinct from ordinary insulation which is not refractory and has little if any load sustaining ability, and they are also distinct from ordinary refractories because the pores are more numerous and more than large enough to be seen by the naked eye.

The invention has for its particular object the production of a self-insulated refractory having a highly porous interior to give it the desired heat insulating property and an outer portion which is substantially free of pores and solid and therefore is impermeable by, and resistant to the attack of molten glass. Such a refractory is of particular utility when produced in the form of an orifice ring for delivering molten glass, although it may be formed into bricks and other articles. Insulating refractories heretofore used have been porous throughout and cannot be used in contact with molten glass or slag.

It has been proposed heretofore to make porous refractories having an impermeable outer portion or surface of the general character of that embodied in the present invention by applying a layer or coating to a porous body constituting the interior of the article or by filling a hollow impermeable body with non-refractory insulation. Various methods have been proposed for this purpose, such as the dipping of the porous inner body in a slip, spraying a coating or outer layer on the porous body, spreading the outer layer on the porous body by hand, and forming the article by separate pressing operations to form the parts of the article.

However, the prior methods have certain disadvantages with regard to the number of steps necessary to carry them out and with regard to the properties of the articles produced. The prior methods involve a relatively large number of forming steps which do not always result in producing a strong bond between the outer material and the inner material; at least two forming or molding operations have been necessary heretofore. Also the outer material usually differs in composition from that of the inner material and the bond between them usually is so weak that separation is apt to occur. Stated differently, prior insulated impermeable refractories have invariably comprised two distinct layers of different composition having a distinct boundary between them constituting a plane of weakness due either to method of manufacture or to differences in composition or to both.

The present invention largely, if not entirely, overcomes the disadvantages of the prior products in that an impermeable self-insulated refractory body is provided which is continuous in structure, rather than formed in distinct layers, and is of uniform composition throughout its mass instead of being made from different compositions. The continuous structure is due to the fact that my novel refractory is produced wholly from a single batch of material by a single molding operation and therefore is termed a "single body" refractory. It is rendered self-insulated by the formation of pores in the interior and is rendered substantially impermeable to molten glass by preventing the formation of pores in the exterior or outer portion of the body. Because of the fact that the method by which this article is produced requires only a single molding operation, it is very simple and of low cost in practical adaptation. The method comprises a single slip casting operation to produce the novel article.

Other objects and advantages of the invention will be pointed out in the following description of one embodiment of the article and of the method for producing it, which description has reference to the accompanying drawing wherein:

Figures 1 to 4 inclusive illustrate certain steps in the method; and

Figure 5:
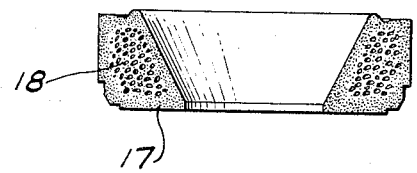

Fig. 5 illustrates an embodiment of the article of the invention.

In carrying out the invention a slip is prepared from refractory materials by the addition of water to the raw material in a blunger or other suitable stirring apparatus. The starting materials may be and preferably are selected for relatively high fusion point, low content of oxides or other fluxes which tend to lower the fusion point, and freedom from such other deleterious impurities as iron oxide which discolor molten glass, all within the requirements for good casting operations. It will be understood that the properties of the raw materials may be varied somewhat according to conditions of use of the article.

In order to form large pores in the slip cast articles, suitable materials for generating a gas therein are added to the slip. For this purpose an excess of the deflocculant used in making the slip, preferably ammonium hydroxide, may be relied upon to react with aluminum powder to form pores in the material. The ammonia is added to the water used to form the slip at the start of the mixing operation but the aluminum powder is not added until after the slip has been thoroughly stirred and just before the slip is to be cast, allowing only enough time for the powder to be distributed through the slip. This delay in adding the aluminum delays the gas forming reaction for a purpose which will later appear.

Fig. 1 illustrates a container 6 for slip indicated at 7, which has been stirred by the agitator or blunger 8. Aluminum powder shown at 9 is being introduced into the slip.

Figure 2:
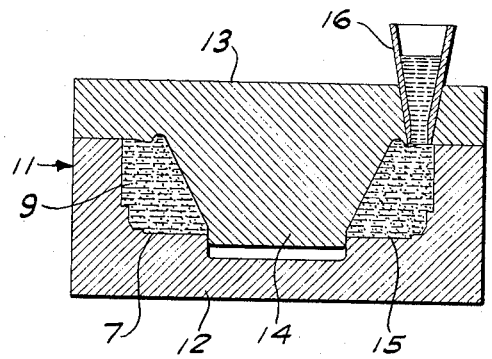
Figure 3:
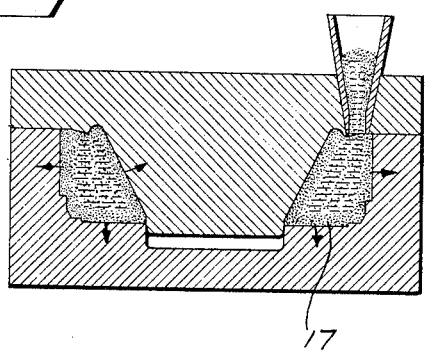

As soon as the aluminum powder is stirred into the slip, it is quickly cast in a mold of the shape to form the desired article. By way of example, there is shown in Fig. 2 a mold 11 comprising a bottom portion 12 and an upper portion 13 having a central core 14 and providing a cavity 15 for forming an orifice ring for delivering molten glass. The slip may be poured in through one or more funnels, one of which is shown at 16.

Throughout the slip 7 in the mold, Fig. 2, are the particles of unreacted aluminum powder indicated at 9. In other words, the gas forming reaction for forming the pores in the article has not started. This reaction is further delayed during the step shown in Fig. 3, or is only about to begin at this time, such delay resulting from the delay in introducing the aluminum powder into the slip, as above explained. This permits the porous mold to absorb from an outer portion 17 of the casting, water containing the ammonia (NH4OH), as indicated by the arrows, Fig. 3.

Figure 4:
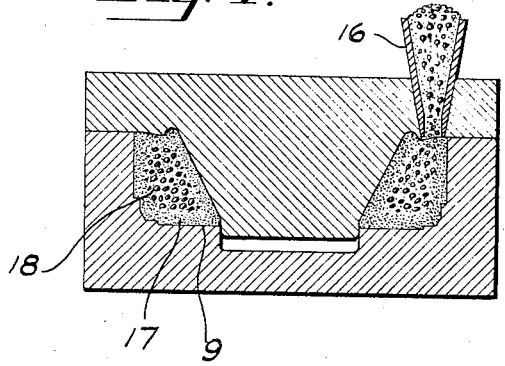

As shown at 18, Fig. 4, the gas forming reaction occurs in the interior of the article and this may cause foaming upwardly through the funnel 16. The gas produced is hydrogen. However, no bubbling occurs in the outer portion or envelope 17 because of the previous withdrawal of ammonia from this portion which leaves it in a semi-dry state in which condition there is no reaction. This leaves particles of free metallic aluminum 9 in the outer portion 17 and the reaction of the ammonia and the aluminum in the interior of the article forms the hydrogen gas and aluminum hydroxide. Both the metallic aluminum and aluminum hydroxide are converted to aluminum oxide during subsequent treatment of the slip cast article. A slight amount of bubbling may occur within the outer surface portion 17 inwardly of the surface. However, most, if not all, of any bubbles so formed collapse because of the lack of gas necessary to maintain them until the slip is set and most of these bubbles remaining are scattered or occur in the innermost part of portion 17 in the undefined zone in which the transition from solid to highly porous material is found.

After the article is dried it is removed from the mold and fired in the usual manner. If desired the gate marks on the article may be pointed or smoothed over by a suitable tool while the article is somewhat moist.

Thus it will be seen that a self-insulated refractory article may be produced by a single slip casting operation wholly from a single batch but which is rendered insulating by the formation of pores in the interior of the article and solid or impermeable by molten glass on the outer portion, by preventing the formation of pores in the outer portion. It also will be understood that after this slip cast article is fired it is of continuous structure, that is, it is a single body and therefore has a continuous structure in the sense that there are no distinct layers with an interfacial boundary between them and hence no plane of weakness as in the multilayer refractories of the prior art. On the contrary, there is a more or less irregular and gradual transition of the impermeable or solid material to the interior material of high porosity. In other words, the pores extend into the solid portion to varying distances and more or less diminish in size in that direction. The uniformity in composition due to the use of a single batch and the irregular graduation from solid to porous condition prevents spalling or separation of the impermeable portion from the porous portion and has other advantages. The condition of porosity here described is visible to the naked eye in a cross section of the article about as shown in Fig. 5. However, this structure has not been depicted in the drawing in all details because of the difficulty of showing the very small pores.

Some articles embodying the invention show some internal lamination but this usually is so slight as to be negligible or is not objectionable.

The impermeable or solid outer portion is sufficiently resistant to the corrosive and erosive action of molten glass to permit its use in contact therewith. Furthermore, this outer portion can be made sufficiently thick for practical purposes, said portion usually varying from about one-eighth to about one-quarter of an inch in thickness. Exact measurements are made impossible by the lack of boundary. When embodied in an orifice ring, the solid or impermeable portion is more than sufficient because such an article usually must be discarded when it becomes worn and replaced by another ring in order to form the glass issuing therefrom to the desired dimensions. However, the article of the present invention cannot be used where the action of molten glass is severe, because if the outer, relatively impermeable portion should be worn away, the highly porous interior would be exposed to attack and would wear away so rapidly that failure might occur sooner than is permissible in the case of refractories subject to severe attack.

The relatively solid outer portion imparts load sustaining and impact strength to the refractory.

*Example*

As an example of the manner in which the invention may be employed in practice, the following batch may be used:

| | Per cent |
|---|---|
| Grog (100 mesh and fines) | 70 |
| Kaolin, such as white Georgia kaolin | 15 |
| Ball clay, such as K. T. ivory clay | 15 |

NH4OH for deflocculant 100 cc. for 10 pound batch.

Aluminum powder 10 grams per 10 pound batch.

Proportions may be varied to suit different uses. By "grog" is meant calcined kaolin or fire clay having highly refractory properties or natural sillimanite, or other natural mineral of the sillimanite group, such as calcined kyanite or andalusite or either ceramically produced (kiln fired) or electrically fused synthetic material, such as mullite or aluminum oxide or other stable relatively inert and refractory grains. A preferred grog is natural sillimanite.

The ingredients are mixed to proper casting consistency with the addition of water and the use of ammonia as deflocculent and aluminum powder is added as late as possible in the preparation of the casting batch so as to delay the gas-forming reaction of the ammonia and alumina, while permitting the aluminum powder to be well stirred into the batch. The batch is now cast, as above explained, in such manner as to permit the porous mold to absorb the ammonia from the outer portion of the casting to prevent the formation of pores in such portion to make it substantially impermeable and solid, while leaving the ammonia in the interior portion to form large pores therein and render the article heat insulating in character. The pores may be as large as one-sixteenth of an inch in diameter.

After the article has been removed from the mold and sufficiently dried, it is fired to a temperature not less than 2400° F., a preferred firing temperature being 2650° F. The article, when produced from the preferred batch is light buff in color.

The insulating property of the ring so produced is sufficient to make external insulation thereof unnecessary for most uses of the ring. This eliminates insulation and simplifies installation and removal of the ring.

In the appended claims, all references to pores relate to pores readily visible to the naked eye and do not refer to microscopic pores unless expressly so stated. The term "single body" is used in the claims as it is used above, that is, to define a refractory containing the kiln-fired derivatives of a single batch of refractory material.

Having thus described my invention what I desire to claim and secure by Letters Patent is:

1. In the art of forming a porous, self-insulated refractory article, the steps comprising casting a slip of refractory batch material of the alumina-silica type in a porous mold, generating gas in the slip to form pores in the interior of the cast article and preventing the generation of gas in that part of said slip which forms an outer appreciably thick portion of the article to prevent the formation of pores therein and to render such outer portion substantially impermeable and solid.

2. In the art of forming a porous, self-insulated refractory article, the steps comprising casting a slip of refractory batch material of the alumina-silica type in a porous mold, generating gas in the slip by introducing a liquid chemical reagent and a metal into the slip to generate pore-forming gas therein, the metal being added to the slip feed before casting it, and preventing the generation of gas in that portion of the slip forming an outer appreciably thick portion of the article by abstracting the liquid reagent from said portion before it can react substantially with said metal, whereby the formation of pores in said outer portion is prevented and said outer portion is rendered substantially impermeable by molten glass.

REINHOLD A. SCHAEFER.